Nov. 15, 1966    P. A. JOHNSON    3,285,393
SUSPENDED FLEXIBLE STRAND CONVEYOR
Filed Sept. 27, 1957    4 Sheets-Sheet 1
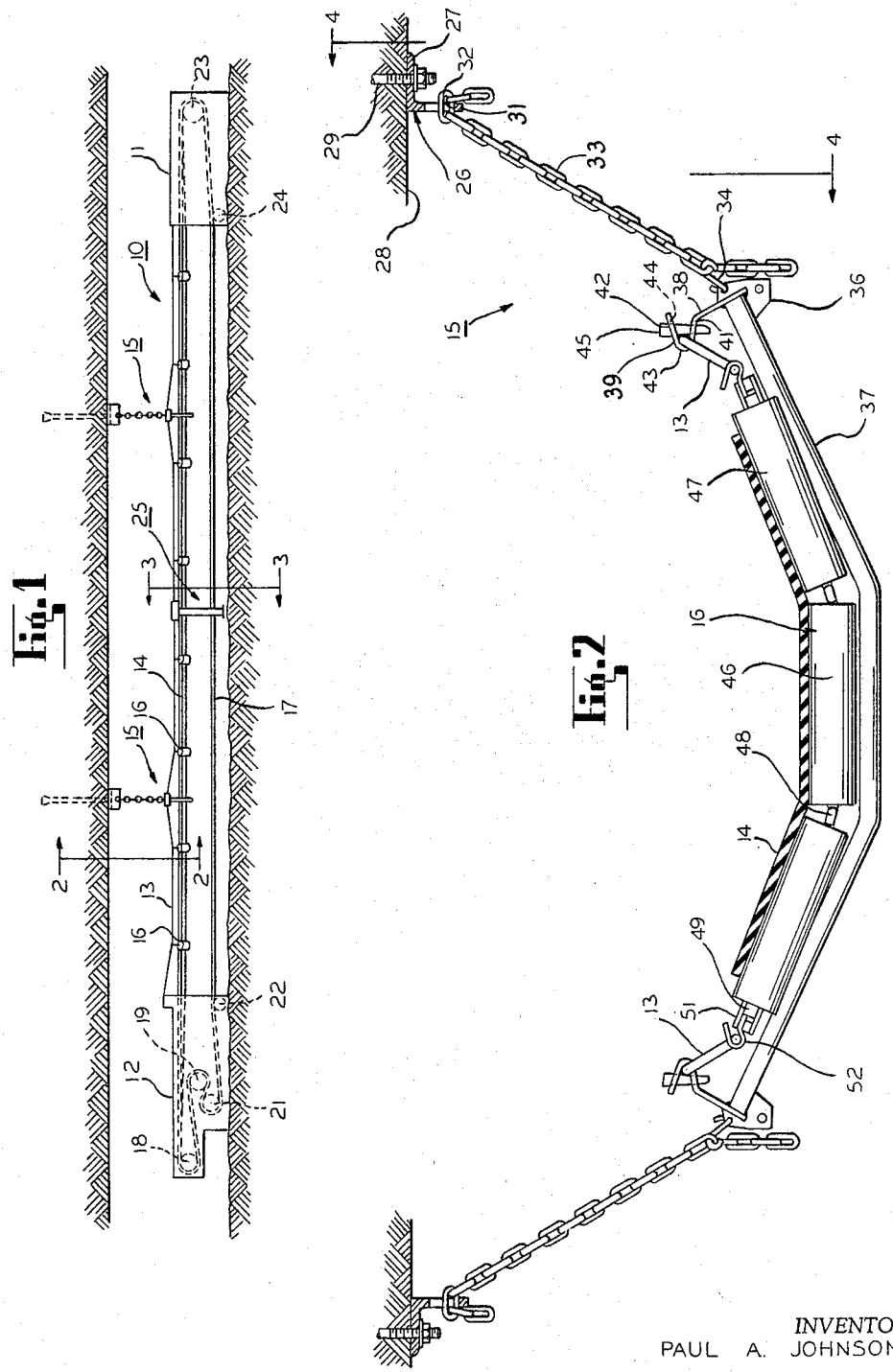
INVENTOR.
PAUL A. JOHNSON
BY Murray A. Gleeson
ATTORNEY Nov. 15, 1966 P. A. JOHNSON 3,285,393
SUSPENDED FLEXIBLE STRAND CONVEYOR
Filed Sept. 27, 1957 4 Sheets-Sheet 2
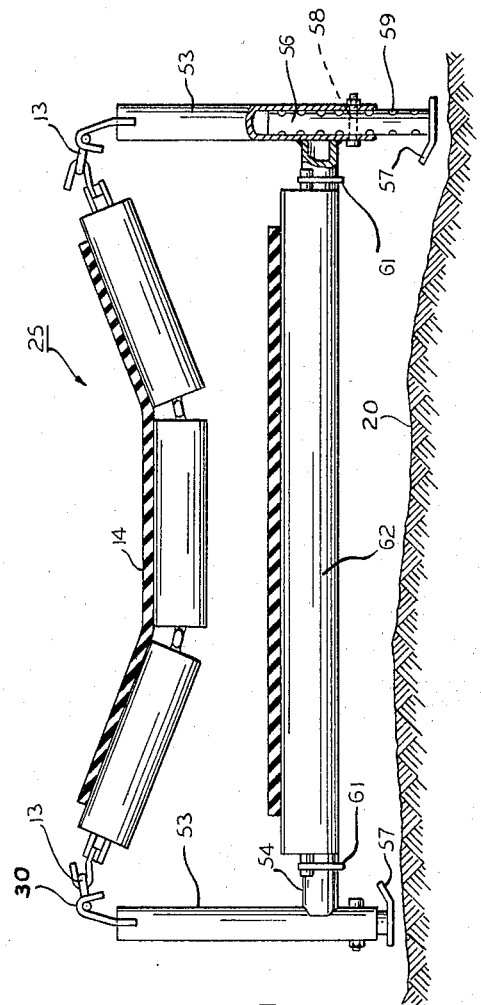
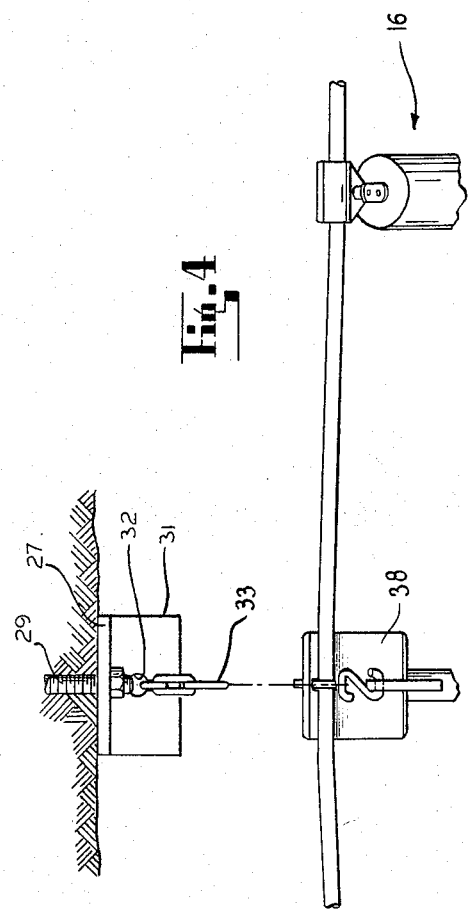
INVENTOR.
PAUL A. JOHNSON
BY
Murray A. Gleeson
ATTORNEY

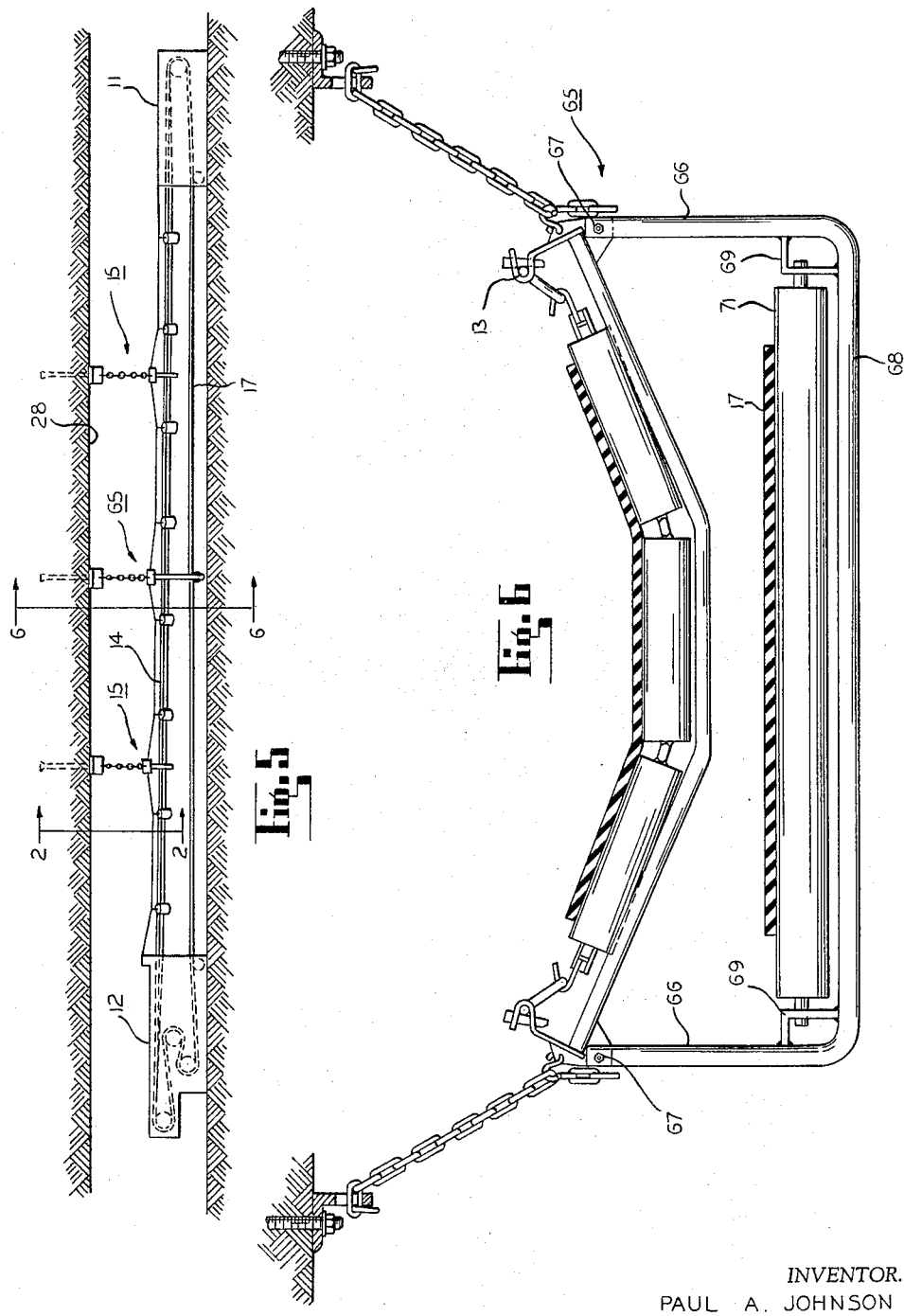

Nov. 15, 1966    P. A. JOHNSON    3,285,393
SUSPENDED FLEXIBLE STRAND CONVEYOR
Filed Sept. 27, 1957    4 Sheets-Sheet 4
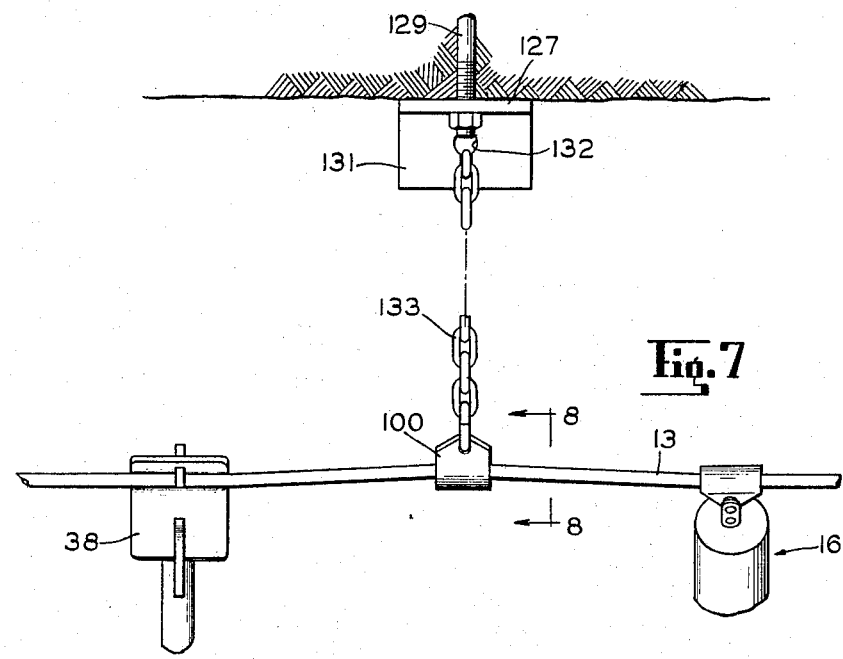
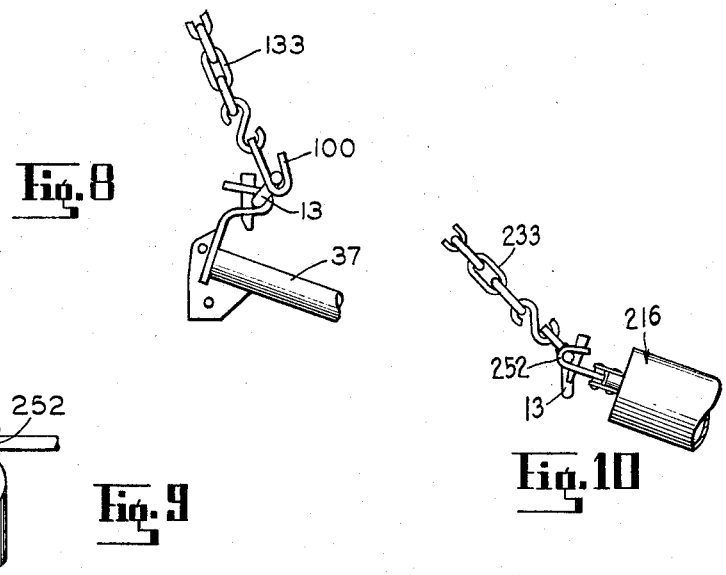
INVENTOR.
PAUL A. JOHNSON
BY Murray A. Gleeson
ATTORNEY

United States Patent Office 3,285,393
Patented Nov. 15, 1966

3,285,393
SUSPENDED FLEXIBLE STRAND CONVEYOR
Paul A. Johnson, Fairmont, W. Va., assignor, by mesne assignments, to Westinghouse Air Brake Company, Pittsburgh, Pa., a corporation of Pennsylvania
Filed Sept. 27, 1957, Ser. No. 686,716
9 Claims. (Cl. 198—192)

This invention relates generally to endless belt conveyors and more particularly to flexible sideframe type conveyors wherein at least the conveying reach of the belt is carried upon flexible strand means which are supported in such manner that the flexible strand means is shiftable and movable in response to a load being carried by the conveyor.

The conveyor assembly, according to the present inventive concept, is of the type which permits the load being carried on the conveying reach of the belt to be transferred therefrom through troughing assemblies, which are suspended on flexible strand means, to the flexible strand means and then further transferred therefrom by flexible hanger devices to a suitable type of supporting structure without hindering or preventing the desired concurrent flexing properties of the strand means and troughing assemblies.

There are several distinct, unobvious and desired results and advantages gained by using conveyor assemblies of the flexible sideframe type; briefly, some of the advantages are:

(1) inherent self-alignment of the conveyor assembly.
(2) Impact absorption which makes it virtually impossible for sudden excessively large loads to destroy the conveyor assembly.
(3) Improved load retention with substantially no spillage.
(4) Automatic training and guiding of both the conveying reach and return reach of the belt.
(5) Automatic centering of the load being carried by the conveying reach of the belt, and
(6) Ready adaptability to different types of topography such as spans, uneven irregular underlying surfaces, etc.

These results and advantages are primarly gained by the concurrent flexing properties of the flexible strands and troughing assemblies. In addition to the concurrent flexing of the flexible strands and troughing assemblies there is also relative movement between the various elements of the conveyor assembly and more specifically there is definite relative movement of the flexible strand means, both transversely and longitudinally, in relation to the supporting structure used therefor.

It is desirable to have the supporting structure used for suspending the flexible strand means along the desired course to be as rigid and immovable as possible, but yet the supporting structure should permit the transverse and longitudinal movement of the flexible strand means relative thereto. In certain instances, it is necessary to provide an anti-friction connection between the supporting structure and the flexible strand means to permit the longitudinal movement of the strand means relative thereto and then suspend the troughing assemblies from the strand means at locations which are remote from the location of the supporting structure to permit the concurrent flexing of the strand means and troughing assemblies; or alternatively to have the supporting structure secured to and movable with the strand means during the longitudinal movement thereof and to suspend the troughing assemblies at locations remote from the locations of securement of the strand means to the supporting structure to permit the transverse relative movement of the strand means at the locations where the troughing assemblies are suspended.

In these instances the supporting structure, at the locations where the flexible strand means are supported, prevent transversely flexible movement of the strand means and also function as spreader and guide means for maintaining the strand means trained along the desired course.

It is a primary object of this invention to support the flexible strand means of a flexible sideframe type conveyor assembly from a supporting structure at locations which can be either remote from or substantially identical with the locations where the troughing assemblies are suspended from the flexible strand means without hindering or limiting the desired concurrent flexing movement of the strand means and troughing assemblies and which also permits the longitudinal shifting movement of the strand means relative to the supporting structure.

It is an object of this invention to provide a rigid and substantially immovable supporting structure for the flexible strand means of a flexible sideframe type conveyor assembly which includes flexible hanger-type devices enabling the strand means to have the desired flexing properties and the transverse and longitudinal movements relative to the supporting structure with the flexible strand means being supported by the hanger-type devices at the locations where the troughing assemblies are suspended from the strand means or at other locations remote therefrom.

It is an object of this invention to support the flexible strand means of a flexible sideframe type conveyor at the locations thereon where the troughing assemblies are suspended therefrom or at other locations remote from the locations at which the troughing essemblies are suspended therefrom, so that the flexible strand means will shift transversely and longitudinally toward a loaded portion of a conveying reach of a belt being supported by the troughing assemblies, in response to the load thereon, and away from an unloaded portion thereof, and thus retain the desired results and advantages, outlined briefly above, of this type of conveyor assembly.

It is a further object of this invention to support the flexible strand means of a flexible sideframe type conveyor assembly at locations thereon, as stated above, by supporting means which permit the shifting or movement of the flexible strand means, at such loactions, both transversely and longitudinally, with the supporting means also acting as spreader and guide means for maintaining the strand means trained along a given path.

It is an object of this invention to support the flexible strand means of a flexible sideframe type conveyor assembly by suspending the strand means, through flexible hanger-type devices, from a supporting structure so that the flexible strand means and troughing assembiles retain the desired concurrent flexing properties.

It is an object of this invention to support the strand means of a flexible sideframe type conveyor from a rigid substantially immovable means, such as a mine roof, face, wall, floor, or the like, by suspending the strand means from a supporting structure which is carried by such substantially immovable means and which includes a flexible hanger-type device, such as a chain, a linkage, a pivoted rod, or the like, without destroying the desired movement of the flexible strand means, both transversely and longitudinally, and controlling such movement in a definite desired path, such as an arc of a pendulum.

It is a further object of this invention to provide spacer or spreader means for maintaining the flexible strand means trained along the desired course which may be the supporting means or structure alone, as stated above, or may be separate spacer of spreader units which may be either suspended directly from the supporting structure;

directly from the flexible strand means at the locations where the strand means are supported by the supporting structure; or at locations which are spaced remotely from the locations where the strand means are suspended from the supporting structure.

It is a further object of this invention to provide spreader or spacer units for maintaining the flexible strand means trained along the desired course and which are connected to and/or suspended directly from the flexible strand means at locations which are longitudinally spaced relative to the locations where the strand means support the troughing assemblies.

It is a further object of this invention to support and guide the return reach of the belt conveyor of a flexible side frame type conveyor assembly from the spreader or spacer units.

It is also a further object of this invention to provide spreader or spacer units for a flexible sideframe type conveyor assembly which maintains the flexible strand means trained along the desired course and which supports and guides the return reach of the conveyor belt by securing and/or suspending such spreader or spacer units directly from the supporting structure for the flexible strand means; the flexible strand means at the locations where the supporting structure supports the strand means; or the flexible strand means at locations which are remotely spaced from and are intermediate the locations at which the strand means are supported.

In one form of the invention, the spreader or spacer unit, above, may be provided with downwardly projecting feet portions which are normally vertically spaced above an underlying supporting means, i.e. the mine floor, and which are adapted to make direct contact with the underlying supporting means when excessively large abnormal loads are carried thereover by the conveying reach of the belt and thus transmit the force created by such excessively large loads into the rigid substantially immovable underlying supporting means. Accordingly, it is a further object of this invention to provide spreader or spacer units for maintaining the flexible strand means trained along the desired course and which will transfer the force created by an excessively large load carried by the conveyor belt to the underlying supporting means.

It is a further object of this invention to support and guide the return reach of the belt of a flexible sideframe type conveyor assembly from the one form of spreader or spacer unit, above, so that if it is desired, the weight or force created by the return reach of the belt may also be transferred into the underlying supporting means.

It is a further object of this invention to provide, the one form of a spreader or spacer unit, above, with adjustable downwardly projecting feet portions, with each foot portion being independently adjustable relative to the underlying supporting means so that the normal load to be carried by the conveyor may be predetermined and the feet portions will not make the direct contact with the underlying supporting surface until the predetermined load is exceeded and thus, in effect, the load carrying capacity of the supporting structure can be predetermined.

It is a still further additional object of this invention to suspend a flexible sideframe type conveyor from a supporting structure so that any irregularities found in the topography of the course, which is desired to be traveled, may be easily spanned.

It is a still further additional object of this invention to suspend a flexible sideframe type conveyor assembly from a primary support means, such as a mine roof, so that when the conveyor assembly is in a normally loaded condition the conveyor assembly is vertically spaced in relation to an underlying secondary support means, such as a mine floor, and if necessary and desired, under an excessively heavy abnormal loaded condition, the conveyor assembly will make contact with the secondary support means in order to supplement the support given thereto by the primary support means.

Other objects and important features of the invention will be apparent from a study of the specification following taken with the drawing which together describe and illustrate a number of preferred embodiments of the invention and what are now considered to be the best modes of practicing the principles thereof. Other embodiments may be suggested to those having the benefit of the teachings herein, and such other embodiments are intended to be reserved especially as they fall within the scope and breadth of the subjoined claims.

In the drawing:

FIG. 1 is a side elevational view of a suspended flexible sideframe type conveyor assembly having the improvements according to one arrangement of the present invention embodied therein;

FIG. 2 is an end elevational view looking in the direction of the arrows 2—2 of FIG. 1 showing details of the supporting structure for suspending the conveyor assembly of FIG. 1 from a support means such as a mine roof or the like and one form of the spacer or spreader unit thereof;

FIG. 3 is an end elevational view looking in the direction of the arrows 3—3 of FIG. 1, showing details of another form of spacer or spreader unit for supporting and guiding the belt and for maintaining the troughing assembly supporting flexbile strand means trained in properly spaced relationship along the desired course;

FIG. 4 is a detailed larger scale side elevational view showing details of the supporting structure for suspending the flexible strand means at a certain location;

FIG. 5 is a side elevational view similar to FIG. 1, showing another arrangement of the present invention;

FIG. 6 is an end elevational view similar to FIGS. 2 and 3 of still another form of the spacer or spreader unit, looking in the direction of the arrows 6—6 of FIGURE 5;

FIG. 7 is a detailed larger scale side elevational view similar to FIG. 4, but showing the details of the supporting structure for suspending the flexible strand means at a different location;

FIG. 8 is a fragmental end elevational view looking in the direction of the arrows 8—8 of FIG. 7;

FIG. 9 is a fragmental detailed larger scale side elevational view, similar to FIGS. 4 and 7, but showing the details for suspending the flexible strand means at still another location; and FIG. 10 is a fragmental end elevational view of FIG. 9 showing how flexible devices of the supporting structure may function to both support the flexible strand means and maintain the flexible strand means trained along a given course.

Attention is now directed to that arrangement of the invention, as illustrated in FIGS. 1 to 4 of the drawing, wherein, there is shown an endless belt conveyor assembly 10 having a tail or end section 11 and a head or other end section 12. The end sections 11 and 12 provide abutments for and support the end portions of the flexible strand sideframe means 13—13. The pair of laterally spaced flexible strand sideframes means 13—13 are supported at longitudinally spaced intervals intermediate their respective end portions by supporting structures 15 which are supported or carried by a primary supporting means, such as a mine roof, 28, as illustrated in the drawing. Alternatively, the strand means 13—13 may be supported from other types of primary supporting means, such as stands or towers, not shown, or from any suitable means which will vertically space the conveyor assembly 10 above an underlying surface 20, such as a mine floor, which may also be used as a secondary supporting means, if desired.

An endless conveyor belt having a conveying reach 14 is arranged to have the load being carried thereon transmitted into the laterally spaced strand sideframe means 13—13 by troughing roller assemblies 16 or other suitable anti-friction means which span the space between the strand means 13—13. The endless belt includes a return reach 17, and the endless belt is reeved around an idler pulley 18 at the head or other end section 12 and around a snubber pulley 19 also located at the head or other end section 12. The belt is driven by a driving pulley 21 and guided over an idler pulley 22, both at the head or other end section 12, and is reversed in direction about an idler pulley 23 at the tail or end section 11, with the return reach 17 thereof also being guided over an idler pulley 24 thereat.

The return reach 17 of the belt may be supported and guided by spacer or spreader units 25, which are positioned longitudinally along the strand means 13—13 intermediate the supporting structures 15, with such units being also arranged to maintain the strand sideframe means 13—13 in properly spaced relationship and trained along the respective desired courses between the supporting structures 15.

In another form, a spreader or spacer unit 37, as illustrated in FIG. 2 of the drawing, differs from that form of spacer or spreader unit 25, above, FIG. 3, in that the spreader or spacer unit 37 does not support or guide the return reach 17 of the belt and is also not provided with generally downwardly projecting independently adjustable feet portions 57, to be described in more detail hereinafter, which may engage and contact the secondary supporting means or mine floor 20.

In still another form, a spreader or spacer unit 65, as illustrated in FIG. 6 of the drawing, differs from the unit 37, and is similar to the unit 25 by supporting and guiding the return reach 17 of the belt but differs from the unit 25 by not including the generally downwardly projecting secondary supporting means engaging feet portions 57.

It is to be understood, that in any given conveyor assembly that any combination, sub-combination or single modification of the spacer or spreader units 25, 37 and 65 may be used and that the arrangements thereof, as shown and described herein, are for the purpose of illustration only. In other words, a successfully operative conveyor assembly may include none, any one, a combination of any two or all three of the spreader or spacer units 27, 37, 65, as disclosed herein. Also, if the spreader or spacer units 25 or 65 are employed these units may be positioned and carried by the flexible strand means 13—13 at the locations where the strand means are supported by the supporting structures 15; or at locations intermediate of and longitudinally spaced therefrom. Since the spreader or spacer unit 25 is provided with the generally downwardly projecting secondary supporting means (engaging feet portions 57), it is desirable to position the units 25 intermediate of and longitudinally spaced from the locations where the flexible strand means 13—13 are supported by the supporting structures 15. This enables the units 25 to be moved downwardly under an excessively large load being carried by the belt so that the feet portions 57 make contact with the secondary supporting means 20.

The conveyor assembly 10 is suspended from a primary supporting means by a plurality of laterally spaced supporting structures 15 which are longitudinally spaced and substantially aligned along the course of each strand means 13. Each of the supporting structures 15 include an anchor member having a substantially horizontally disposed leg or securing portion 27 secured to and held against the primary supporting means (mine roof) 28 by a roof pinning bolt or other type of securing means 29. Further, each of the anchor members 26 is provided with a substantially vertically disposed downwardly depending leg or connecting portion 31 which has removably connected thereto one end of a flexible supporting device or linkage 33, such as a chain or pivoted rod, by a connecting means 32, such as a key hole slot therein, see FIG. 4.

The other end of each flexible supporting device 33 may be connected directly to the flexible strand means 13—13 by a suitable connecting means, such as a hook-type member 100, FIG. 7; directly to the troughing assemblies 216 by a suitable connecting means, such as a U-shaped bracket 252, FIG. 9; or directly to the spreader or spacer units 37, 65 by a connecting means, such as a bracket plate 36, 36a located at the opposite ends of each unit, FIGS. 2 and 6 respectively.

It is believed that only one form of the connecting means used in connecting the other end of each flexible supporting device 33 to the spacer or spreader units 37 and 65 need be described in any detail and attention is directed to FIGS. 2 and 4 wherein the other end of the flexible supporting device 33 is provided with a connecting means 34, such as a hook, which is received within an aperture in the respective bracket plate 36 of the spacer or spreader unit 37. A similar bracket plate 36a is provided at the laterally spaced opposite ends of the spacer or spreader unit 65, FIG. 6, for securing this form of the spacer or spreader unit to the other end of the flexible supporting device 33.

In the form of the spacer or spreader unit 25, FIG. 3, it is to be noted that this unit is carried and suspended directly from the flexible strand means 13—13 by an upwardly extending connecting means, such as a hook-type portion 30 at locations which are longitudinally spaced from both the locations where the troughing assemblies 16 are suspended therefrom and the locations where the other end of the flexible supporting devices 33 are connected thereto.

It is to be noted that each of the forms of the spacer or spreader units 25, 37 and 65, in addition to the particular specialized functions, described above, also maintain the laterally spaced flexible strand means trained along substantially parallel courses. It is also desirable that each of the units 25, 37 and 65 be positioned along the strand means 13—13 at locations which are longitudinally spaced from the locations where the troughing assemblies 16 are suspended therefrom and in addition the spacer or spreader unit 25 should be positioned at locations which are also longitudinally spaced from the locations where the strand means 13—13 are supported by the supporting structures 15.

As stated above, all forms of the spacer or spreader units 25, 37, 65 maintain the strand means 13—13 trained along the desired course and each of these units are connected directly to the strand means 13—13, and in the form of the spacer and spreader units 65 and 37, there is provided for this purpose a bracket arm 38 extending upward from each end thereof which is bent inwardly to form a substantially horizontally extending U-shaped mounting means 39 having a lower limb 41 and an upper limb 42 connected by a bight 43. The mounting means 39 is provided with aligned apertures 44 which receive a locking pin or wedge 45 which firmly wedges the flexible strand means 13—13 into the bight 43.

Also, if desired, the bracket arms 38, mounting means 39 and wedges 45 may be used as a connecting means for connecting the spacer or spreader units 37 and 65 directly to the flexible strand means 13—13 at locations thereon which are longitudinally spaced from both the locations where the strand means are supported by the supporting structures 15 and the locations where the troughing assemblies 16 are suspended from the strand means, note FIGS. 7 and 8.

Referring now in more detail to the spacer or spreader unit 25, FIG. 3 of the drawing, the flexible strand sideframe means 13—13 are maintained in properly spaced relationship intermediate the supporting structure 15 by the unit 25, which includes depending hollow tubular members 53 rigidly connected together by means of a laterally extending strut 54. Each of the tubular members 53 has the upper end thereof terminating in the hook-type portion 30 which corresponds to the mounting means 39 of the units 37 and 65, and the unit 25 is suspended from the laterally spaced strand means 13—13 and maintains the strand means in the properly spaced relationship.

The laterally extending strut 54 has extending therefrom spaced supports 61 which have journalled thereon a return roller 62 for supporting and guiding the return reach 17 of the conveyor belt.

Each of the hollow tubular members 53 has telescoped therewithin a leg member 56 each having a foot portion 57 at the lower end thereof. Each foot portion 57 is independently adjustable by bolts 58 which are arranged to cooperate with apertures 59 in each tubular member 53 so that the respective leg members 56 are independently adjustable with respect to the tubular members 53, and to the underlying secondary supporting means 20. At times it may be desirable to have a portion of the load being carried by the conveying reach 17 of the belt to be transmitted to the secondary supporting means or mine floor 20, and the spacer or spreader units 25 accordingly can deflect in a substantially vertically downward direction with the amount of such deflection being limited by the feet portions 57, which may be adjusted to accommodate for irregularities in the mine floor.

Referring in more detail to the form of the spacer or spreader unit 65, FIG. 6, the unit 65 is essentially in the form of a tubular U-shaped hanger having a pair of upstanding legs 66, the upper ends of which are secured by bolts 67 to the bracket plates 36. The upstanding legs 66 are continuous at their lower ends with a horizontally extending strut member 68, and stiffener angle members 69 may be provided in the manner shown between vertical legs 66 and horizontal strut member 68, such stiffener angle members also providing support for journalling a return roller 71 which supports and guides the return reach 17 of the belt.

It is to be noted that a load being carried by the conveying reach 14 of the belt is transmitted into the strand means 13—13 by anti-friction means such as the troughing roller assemblies 16, each of which include a center load supporting roller 46 flanked at the opposite ends thereof by inclined troughing or wing rollers 47, rollers 46 and 47 being articulately connected as at 48. The outer ends of each troughing or wing roller 47 turns on a shaft 49, and a pair of shackles 51 connected to each shaft 49 are also pivotally connected to a U-shaped bracket 52, which in at least one modification of this invention forms a connecting means for suspending the troughing roller assemblies 16 from the laterally spaced strand means 13—13 and enables the assemblies to shift a limited amount in a substantially horizontal horizontal plane and to deflect under load in a substantially vertical plane. In this form, the troughing assemblies are each suspended from the flexible strand means 13—13 at locations which are longitudinally spaced from the locations at which the strand means is supported by the supporting structures 15.

In another modification of this invention, as illustrated in FIGS. 9 and 10 where like elements have been identified by the 200 series, the troughing assemblies 216 are connected directly to the other end of the flexible supporting device 233 by a connecting means, such as a U-shaped bracket 252. In this modification there is still movement of the troughing assemblies but such movement is controlled in accordance with the arcuate pendulum path of movement of the other end of each of the flexible supporting devices 233 and the supporting means, for supporting the flexible strand means, act themselves as spacer or spreader units for maintaining the flexible strand means trained along a given course.

As stated above, it may be desirable to support the flexible strand means 13—13 directly from the supporting structures 15 and attention is now directed to FIGS. 7 and 8 wherein such modification is illustrated with like elements being identified by numerals of the 100 series.

In this modification the other end of the flexible supporting device 133 is connected to the respective flexible strand means 13 by a connecting means, such as a hook-type bracket 100, which corresponds to the connecting means or hook 34 of the modification illustrated in FIGS. 2 and 6. In this modification the locations, at which the strand means 13—13 are supported by the supporting means 15, are longitudinally spaced from both the locations at which the troughing assemblies 16 are suspended from the strand means 13—13 and the locations at which the spreader or spacer units are carried by the strand means 13—13.

Also, in all modifications and arrangements of this invention there is provided an adjustable means for adjustably connecting the belt conveyor assembly 10 to the primary supporting means (mine roof) 28. The adjustable means, as disclosed, comprises the connecting means (keyhole slots) 32 in the connecting position (vertical legs) 31 of the anchor members 26 and the flexible supporting device (links of the chains) 33 so that if there are irregularities in the primary supporting means such irregularities may be compensated for by adjusting the length of the flexible supporting device.

In all modifications of the invention the desired concurrent flexing properties of the troughing assemblies 16 and strand means 13—13 are retained and the longitudinal shifting movement of each respective strand means 13—13 relative to its supporting structures 15 is permitted. In addition the movement of the strand means is controlled along the path of an arc which is the path of the other ends of the flexible supporting devices 33. It should be noted that the movement of the other end of each flexible supporting device is in the nature of a pendulum since the one end thereof is secured to the respective anchor member 26 so that when moving from a normal position when the conveyor is at rest and/or in an unloaded condition to a loaded condition in response to a load being carried by the conveyor the other ends of the flexible supporting devices 33 are moving in an arcuate path which is longitudinally and/or laterally upwardly in relation to the underlying area and hence is acting against a force created by gravity.

While the invention has been described in terms of a number of arrangements and forms the scope thereof is intended to be limited only by the claims here appended.

I claim as my invention:

1. In a rope frame conveyor having
   a frame comprising a pair of generally parallel ropes trained along a course,
   at least an intermediate portion of said ropes being supported from a plurality of substantially regularly spaced elevated support locations which enables said ropes to be longitudinally shiftable along the course, and
   troughing idler means connected to said ropes and supported by them,
   the improvement comprising
      elongated return roller means, and
         means suspending the elongated return roller means by its end portions from the ropes,
         said suspending means being connected to the ropes at locations spaced from, and independent of, the points of connection of the troughing idler means to the ropes.

2. In combination in a rope frame conveyor,
   a frame, said frame including a pair of generally parallel ropes trained along a course,
   an intermediate portion of said ropes being supported from a plurality of elevated support locations by connecting means which enable said intermediate portion to be longitudinally shiftable along the course,
   troughing idler means connected to said intermediate portion and supported therefrom,
   return roller means, and means for suspending the return roller means by its end portions from the intermediate portion of the ropes, said suspending means being connected to the intermediate portion of the ropes at locations spaced from the point of connection of the troughing idler means to the intermediate portion of the ropes.

3. The rope frame conveyor of claim 2 further characterized in that both the troughing idler means and the return roller means are placed along the intermediate portion of the wire ropes at positions remote from the elevated support locations in a generally horizontal direction.

4. The rope frame conveyor of claim 2 further characterized in that the end portions of the troughing idler means flex toward and away from one another in response to load variations, and further including spreader means connected between the ropes to maintain the spacing of the ropes substantially constant.

5. The rope frame conveyor of claim 4 further characterized in that the suspending means is connected to opposite ends of the spreader means.

6. The rope frame conveyor of claim 4 further characterized in that the return roller means are suspended from the intermediate portion of the wire ropes at locations remote from the connecting means.

7. The rope frame conveyor of claim 2 further characterized in that the means for connecting the intermediate portion of the wire ropes to the elevated support locations are lengths of chain, the upper portion of each chain being effectively connected to an elevated support location and the lower portion to an associated wire rope.

8. In combination in a rope frame conveyor, a frame comprising a pair of generally parallel ropes trained along a course and suspended from a plurality of substantially regularly spaced elevated support means by connecting means enabling at least an intermediate portion of said pair of ropes to shift longitudinally relative to said elevated support means, elongated troughing idler means, and elongated return roller means, each of said troughing idler means and return roller means spanning said ropes and being connected to the ropes for longitudinal movement with longitudinal shifting of the ropes, each of said troughing idler means and return roller means being connected to the ropes independently of one another, the connections between the wire ropes and suspending means for the return roller means being adjustable back and forth along the ropes to thereby adjust the belt training effect of the return roller means independently of the troughing idler means.

9. In combination in a rope frame conveyor, a frame, said frame including a pair of generally parallel ropes trained along a course, an intermediate portion of said ropes being supported from a plurality of elevated support locations by connecting means which enable said intermediate portion to be longitudinally shiftable along the course, troughing idler means connected to said intermediate portion and supported therefrom, the improvements comprising return roller means, and means for suspending the return roller means by its end portions at an elevation beneath the troughing idler means, said suspending means being connected to one of said elevated support locations, the means for connecting the intermediate portion of the wire ropes to the elevated support locations are lengths of chain, the upper portion of each chain being effectively connected to an elevated support location and the lower portion to an associated wire rope.

References Cited by the Examiner

UNITED STATES PATENTS

| | | | |
|---|---|---|---|
| 774,731 | 11/1904 | Ainsworth | 198—192 X |
| 1,076,337 | 10/1913 | Vogel et al. | 198—192 X |
| 1,748,301 | 2/1930 | Mckinley | 198—192 X |
| 2,773,257 | 12/1956 | Craggs et al. | 198—192 |
| 2,798,591 | 7/1957 | Stamos. | |
| 2,805,763 | 9/1957 | McCallum | 198—192 |
| 2,907,448 | 10/1059 | Gleeson. | |

FOREIGN PATENTS

| | | |
|---|---|---|
| 878,538 | 10/1942 | France. |
| 989,934 | 5/1951 | France. |
| 1,025,635 | 4/1953 | France. |
| 1,088,557 | 3/1955 | France. |
| 738,598 | 9/1943 | Germany. |
| 802,453 | 2/1951 | Germany. |
| 827,312 | 1/1952 | Germany. |

EVON C. BLUNK, *Primary Examiner.*

HUGO O. SCHULZ, SAMUEL LEVINE, WILLIAM B. LABORDE, *Examiners.*

G. M. FORLENZA, W. A. SCHUETZ, E. A. SROKA,
*Assistant Examiners.*